April 9, 1957  J. J. GREINER  2,787,945
HAND CULTIVATOR AND WEEDING TOOL
Filed May 4, 1953  4 Sheets-Sheet 1
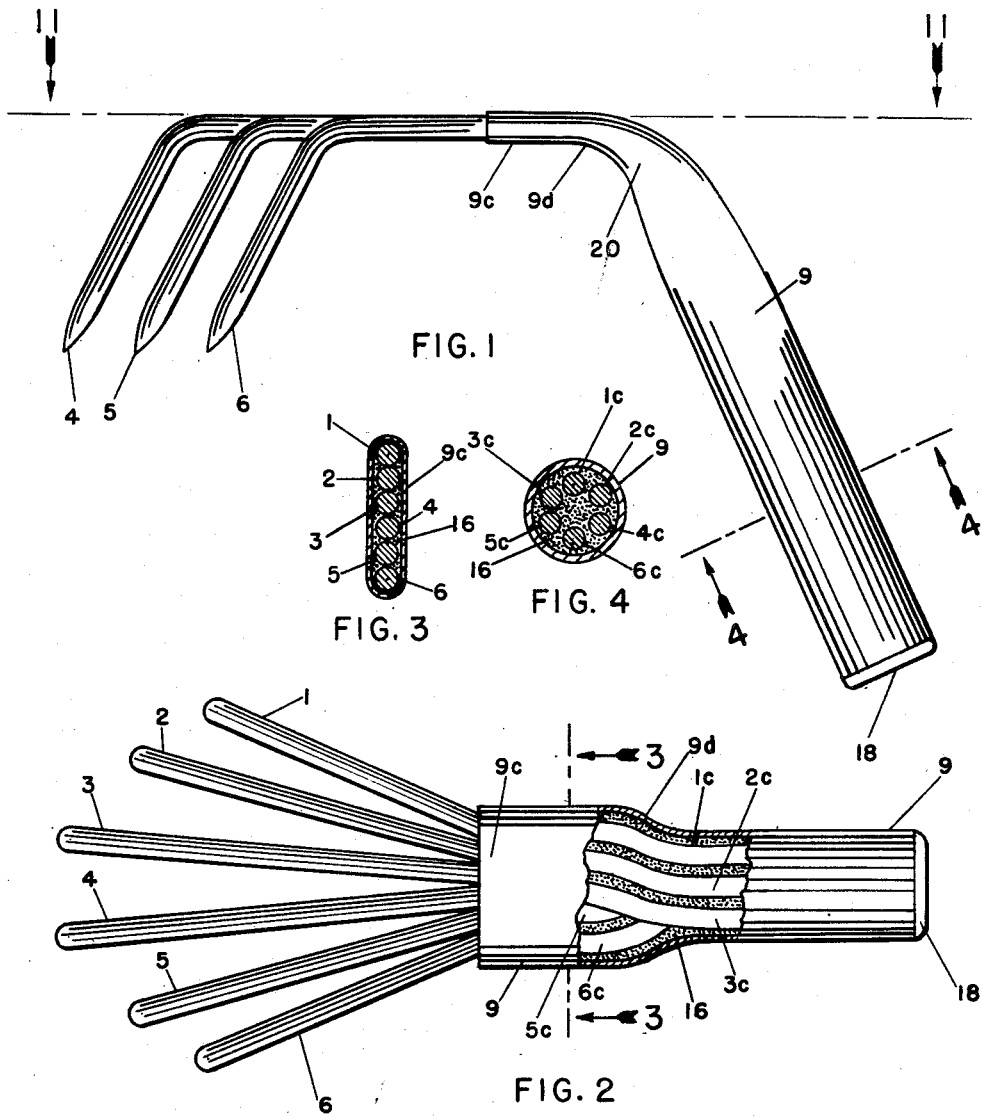
INVENTOR
JOSEPH J. GREINER
BY John B. Brady
ATTORNEY

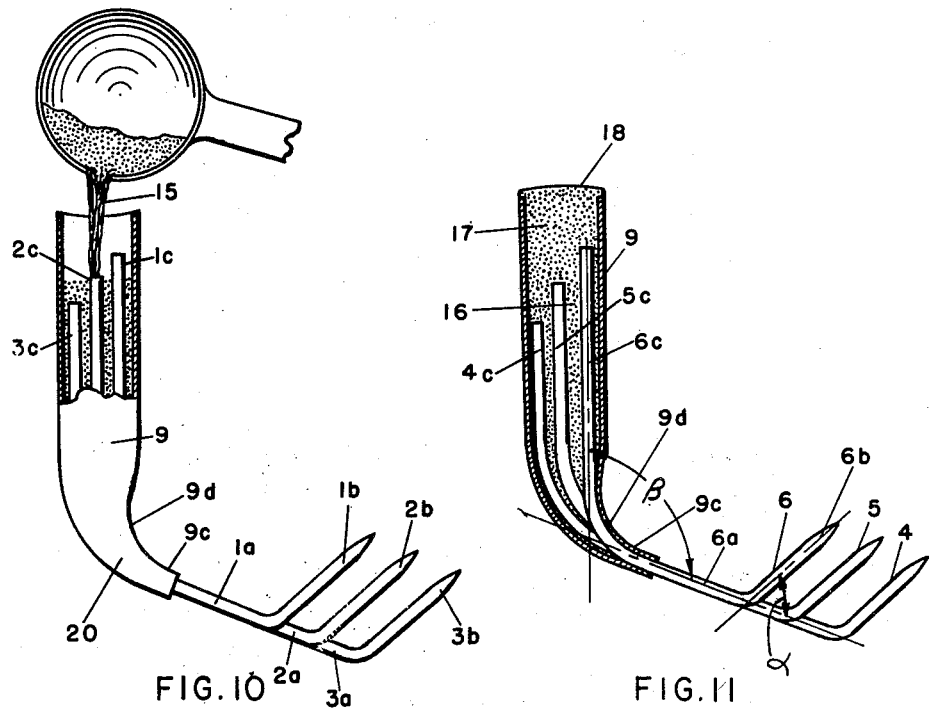
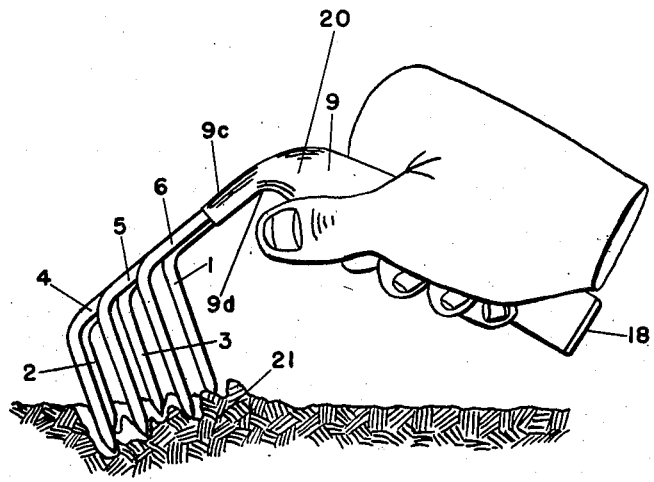

April 9, 1957  J. J. GREINER  2,787,945
HAND CULTIVATOR AND WEEDING TOOL
Filed May 4, 1953  4 Sheets-Sheet 3

INVENTOR.
JOSEPH J. GREINER
BY

April 9, 1957  J. J. GREINER  2,787,945
HAND CULTIVATOR AND WEEDING TOOL
Filed May 4, 1953  4 Sheets-Sheet 4
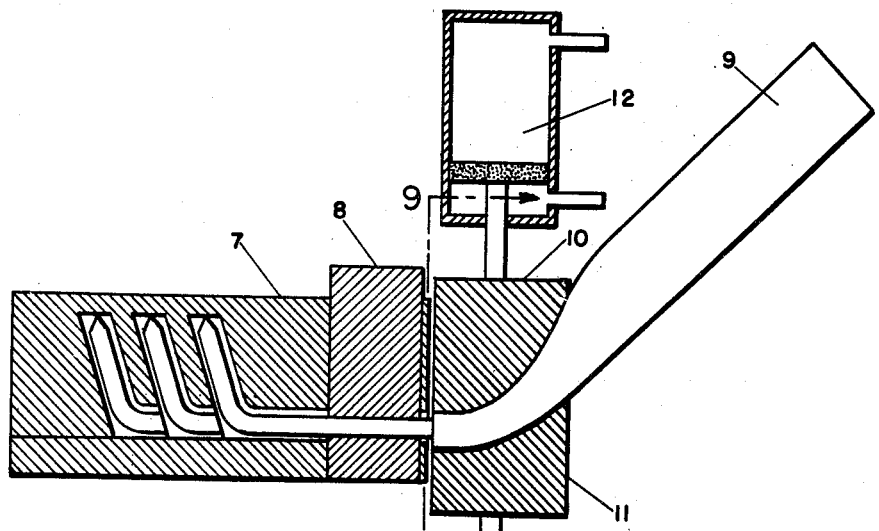
FIG. 8
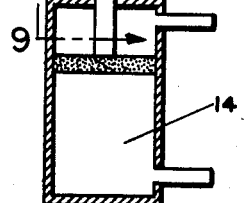
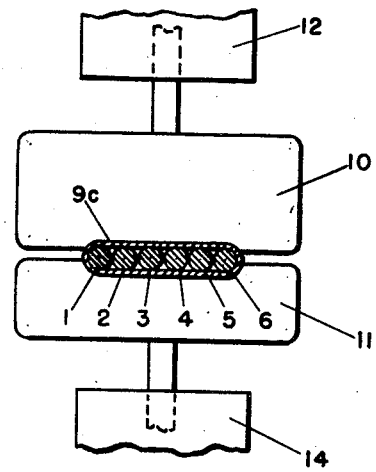
FIG. 9
INVENTOR.
JOSEPH J. GREINER
BY

United States Patent Office 2,787,945
Patented Apr. 9, 1957

2,787,945

HAND CULTIVATOR AND WEEDING TOOL

Joseph J. Greiner, Arlington, Va.

Application May 4, 1953, Serial No. 352,657

7 Claims. (Cl. 97—63)

My invention relates broadly to a construction of hand cultivator and weeding tool and method of manufacturing the same, and more particularly to an improved construction of metallically bonded multiple-tine tool which may be manufactured inexpensively on a mass production scale and be substantially indestructible.

One of the objects of my invention resides in a method of producing an all-metal hand cultivator and weeding tool in which the center of gravity of the tool is disposed in such relation to the hand grip portion of the tool handle that the inertia of the tool may be utilized as an aid in the movement of the hand in cultivating operations.

Another object of my invention is to provide a hand cultivator and weeding tool having a multiplicity of tines that are confined within a tubular metallic handle within which ends of the tines are metallically bonded for forming a substantially indestructible tool.

Still another object of my invention is to provide a handle cultivator and weeding tool having a multiplicity of tines which are identical in construction each having a flat portion and angularly disposed portions on each end thereof extending at differing angles to the flat portion and which may be grouped in a symmetrical manner for insertion into a tubular metallic handle which is compressed thereover at the junction of the handle with the tines while enabling the free ends of the tines within the handle to orient to positions in which the free ends may be bonded by cast metal for firmly bonding the tines within the handle.

A further object of my invention is to provide a construction of hand cultivator and weeding tool in which a tubular metallic handle is compressed at one end thereof for aligning the tines of a multiplicity of tines, with ends of the tines projecting into the tubular handle and bonded therein by cast metal for producing a tool which is substantially indestructible.

A still further object of my invention is to provide a method of manufacturing a hand cultivator and weeding tool in which a multiplicity of tines may be readily assembled in an orientable manner in a jig and a metallic tubular handle introduced over the ends thereof and compressed over the tines for aligning the ends of the tines which project from the handle while orienting the ends of the tines which extend into the tubular handle to positions in which the ends of the tines within the handle may be bonded in cast metal for securing the tines in rigid relation to the handle.

Other and further objects of my invention reside in a method of manufacture and construction of dynamically-balanced all-metal hand cultivator and weeding tool as set forth more fully in the specification hereinafter following by reference to the accompanying drawings, in which:

Figure 1 is a side elevational view of the completed hand cultivator and weeding tool embodying my invention;

Fig. 2 is a top plan view partially broken away and illustrated in section, showing the manner in which the tines are metallically bonded within the tubular metallic handle of the tool;

Fig. 3 is a transverse sectional view taken on line 3—3 of Fig. 2;

Fig. 4 is a transverse sectional view taken on line 4—4 of Fig.1;

Fig. 5 illustrates the completed tool of my invention, showing the manner of use thereof;

Fig. 8 is a view illustrating the shaping dies advanced to a position for compressing the tubular metallic handle around the aligned tines;

Fig. 9 is a fragmentary vertical sectional view on line 9—9 of Fig. 8, illustrating the relation of the shaping dies to the compressed tubular handle of the tool;

Fig. 10 illustrates schematically the manner of pouring the molten metal around the projecting ends of the tines within the tubular metallic handle for bonding the tines within the handle; and Fig. 11 is a vertical sectional view through the completed tool and illustrating the manner in which the tines are metallically bonded within the tubular metallic handle.

My invention is directed to a construction of and method for producing an all-metal dynamically-balanced hand cultivator and weeding tool comprising a multiplicity of metallic tines, each having a flat portion and angularly disposed end portions projecting at differing angles to the flat portion. The tines are all symmetrical in shape and include an earth-engaging portion extending at an acute angle to the flat portion of the tines and a short metallic tubular handle portion enclosing end portions of the tines which extend at an obtuse angle to the flat portions thereof. The tines are symmetrically arranged in a jig, the metallic tubular handle introduced over the projecting ends of the tines and subjected to a compressing operation by shaping dies which collapse the tubular handle against aligned flat portions of the tines for fixedly securing the tines within the tubular metallic handle in accordance with the assembled relation of the tines within the jig. After the compressing operation, the tool is moved to a casting position where a stream of molten metal is caught within the hollow tubular handle and flows around the projecting ends of the tines for permanently bonding the tines in position within the handle. The operations involved are all carried out on a production line basis for producing the tools on a mass scale inexpensively in order to meet the highly competitive market with which a tool of this type is confronted, and yet to provide a superior dynamically-balanced all-metal tool which is substantially indestructible.

Figure 6:
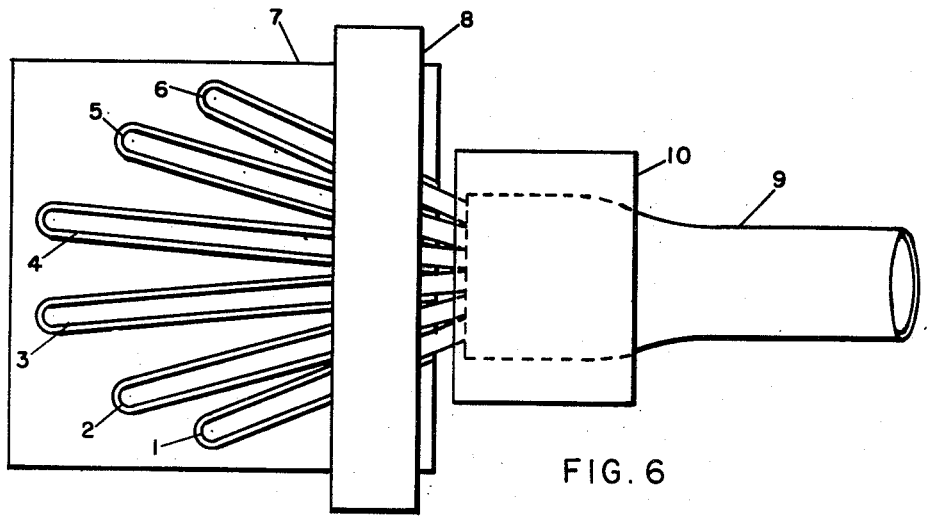
Fig. 6 is a plan view showing the manner of gripping the tines in a jig preparatory to the compressing of the tubular metallic handle thereover.
Figure 7:
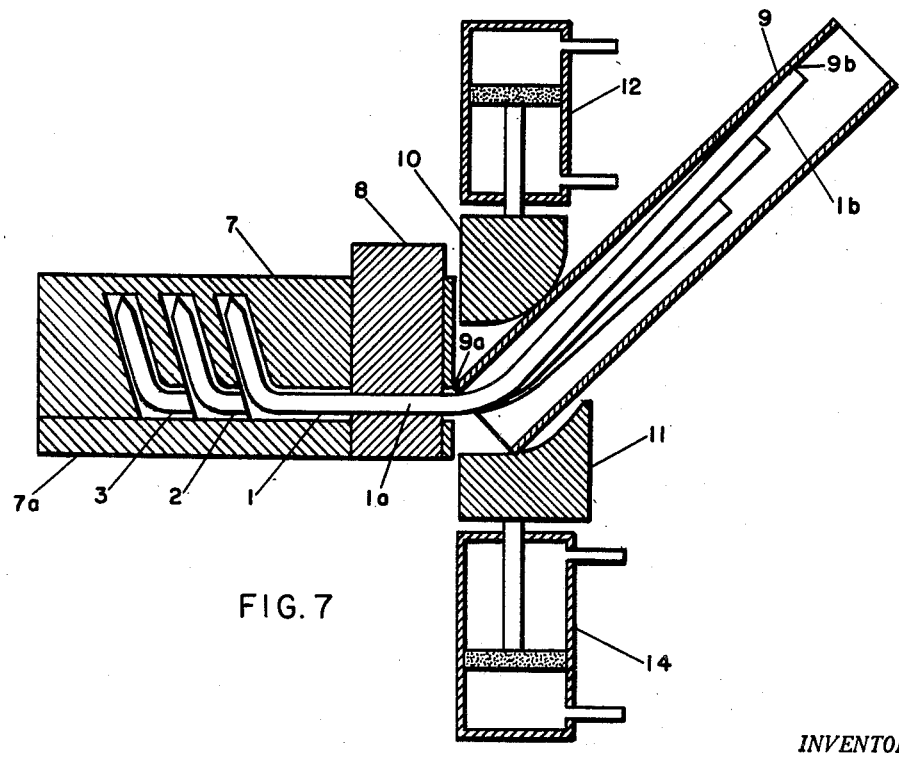
Fig. 7 is a vertical sectional view through the jig of Fig. 6 and illustrating the shaping dies about to compress the metallic tubular handle over the aligned tines.

Referring to the drawings in detail, reference characters 1, 2, 3, 4, 5 and 6 designate tines of the same size and shape. The tines each include an intermediate flat portion designated for example in Fig. 11 at 6a, and end portions of differing lengths designated at 6b and 6c. The end 6b extends at an acute angle α with respect to the flat portion 6a, while the end 6c extends at an obtuse angle β with respect to the flat portion 6a. With the tines assembled in the jig designated at 7 in Figs. 6 and 7 and orientably clamped therein by transverse bar 8 and with the longer portions, such as 1a, illustrated in Fig. 1 for example, extending upwardly, the metallic tube 9 constituting the handle of the device is forced over the upwardly extending ends as indicated in Fig. 7. As the hollow tubular handle 9 is forced over the upwardly extending ends of the tines the individual tines are sufficiently oriented to move the extensions of the tines in the positions illustrated more clearly in Figs. 2 and 4. The echelon arrangement of the tines is determined by the setting of the tines in the jig 7 where the individual tines are confined by individual slots therein. The inside wall of the metallic tubular member 9 establishes contact with the flat portions of the tines as represented at 9a in Fig. 7, while the tips of at least certain of the tines establish contact with the inside wall of the tubular member 9 as represented at 9b. The tubular member 9 is now in a position ready for a compressing operation under the action of the shaping dies represented at 10 and 11 operated by conventional means such as hydraulic press cylinders 12 and 14. The pressing operation produces a smooth rounded joint between the hand grip and the aligned tines.

Figs. 8 and 9 illustrate the compressing operation in which shaping dies 10 and 11 compress the metallic tubular member 9. This operation provides a firm clamp for the tines in a flat zone transverse of the metallic tubular member 9, as represented particularly at 9c in Figs. 1, 2, 3, 5, 10 and 11. The shaping dies 10 and 11 are so curved that a conforming curve 9d is assured in the tool handle intermediate the flat clamping portion 9c and the handle portion of the tubular member 9.

With the tines thus clamped in position the tool is passed to a casting position schematically illustrated in Fig. 10 wherein a stream of molten metal, such as lead, represented at 15, pours into the open end of tubular member 9. The molten metal forms a metallic bond around the upwardly extending ends 1c, 2c and 3c, etc. of the tines. The molten metal is allowed to set as represented at 16 in Figs. 11, 3 and 4, whereupon a solid bond is established between the tines and the handle. In order to conserve the amount of bonding metal required the zone indicated at 17 in Fig. 11 may be stuffed with steel wool and then the remainder of the handle filled to provide a finished end 18 on the hand grip.

The center of gravity of the tool is located approximately at the position 20 so that the tool is dynamically-balanced and the mass of the tool aids in following through with the cultivating action on the earth 21 as depicted in Fig. 5.

The production of the tool of my invention involves a minimum number of manual operations. The principal manual operation involved resides in inserting the tines in the grooves provided therefor in the jig 7 and the insertion of the metallic tubular member 9 over the longer of the projecting ends thereof after which the automatic operations of shaping dies 10 and 11 and the production line filling of the open tubular handles quickly completes the manufacturing process.

The all-metal hand cultivator and weeding tool of my invention has substantial advantages over the conventional wood handle and ferrule device inasmuch as deterioration due to rot is eliminated; loss of the tines is prevented; an accurate dynamic-balance is predetermined; the tool may be more closely gripped; and the tool is rendered substantially indestructible.

While I have described the tool of my invention and the method of manufacturing the same in certain preferred embodiments, I realize that modifications may be made and I desire that it be understood that no limitations upon my invention are intended other than may be imposed by the scope of the appended claims.

What I claim as new and desire to secure by Letters Patent of the United States, is as follows:

1. A hand cultivator and weeding tool comprising a multiplicity of individual metallic tines each having an intermediate flat portion and an angularly disposed free ended portion on each end of said flat portion, said angularly disposed portions extending at differing angles to the flat portion and directed away from each other, a metallic tubular member enclosing the angularly disposed portions of each of the tines on one of the ends thereof and projecting beyond the last mentioned ends of said tines, said metallic tubular member being compressed against said tines in the zone between the flat portions of said tines and the angularly disposed portions thereof that project into said tubular member for securing said tines in symmetrical alignment.

2. A hand cultivator and weeding tool as set forth in claim 1 in which the external angle between the angularly disposed portions of the tines on one of the ends thereof and the flat portion of the tine is acute while the angle between the angularly disposed portions on the other ends of said tines and the flat portions thereof is obtuse.

3. A hand cultivator and weeding tool as set forth in claim 1 in which the external angle between angularly disposed portions of the tines on one of the ends and the flat portions thereof is acute while the angle between the angularly disposed portions on the other ends of said tine and the flat portions thereof is obtuse, said metallic tubular member extending around the ends of said tines which are disposed at obtuse angles with respect to the flat portions thereof.

4. A hand cultivator and weeding tool as set forth in claim 1 in which said metallic tubular member is shaped to conform with part of the flat portions of said tines and all of the angularly disposed portions of the tines at one of the ends of said tines.

5. A hand cultivator and weeding tool as set forth in claim 1 in which said metallic tubular member is shaped to conform with part of the flat portions of said tines and all of the angularly disposed portions of the tines at one of the ends of said tines, and metallic bonding material filling the inside of said metallic tubular member and extending between the ends of said tines for anchoring said tines within said metallic tubular member.

6. A hand cultivator and weeding tool as set forth in claim 1 in which said metallic tubular member constitutes a confining receptacle for bonding metal which is flowed around the ends of the tines therein for securing the tines in position.

7. A hand cultivator and weeding tool as set forth in claim 1 in which said tines are laterally aligned at the position of entry thereof into said metallic tubular member and in which the ends of said tines within said metallic tubular member are oriented into spaced positions, and a bonding metal disposed between the oriented ends of said tines for securing said tines in position.

References Cited in the file of this patent

UNITED STATES PATENTS

| | | |
|---|---|---|
| 1,177,389 | Cronk | Mar. 28, 1916 |
| 1,599,320 | Daniels | Sept. 7, 1926 |
| 1,902,389 | Wolf | Mar. 21, 1933 |
| 2,321,489 | Kaufman | June 8, 1943 |

FOREIGN PATENTS

| | | |
|---|---|---|
| 472,460 | Canada | Mar. 27, 1951 |